United States Patent
Sun et al.

(10) Patent No.: US 9,873,763 B2
(45) Date of Patent: Jan. 23, 2018

(54) SOLUTION OF AROMATIC POLYAMIDE FOR MANUFACTURING DISPLAY ELEMENT, OPTICAL ELEMENT, ILLUMINATION ELEMENT OR SENSOR ELEMENT

(71) Applicants: AKRON POLYMER SYSTEMS, INC., Akron, OH (US); SUMITOMO BAKELITE CO., LTD., Shinagawa-ku (JP)

(72) Inventors: Limin Sun, Copley, OH (US); Dong Zhang, Uniontown, OH (US); Jiaokai Jing, Uniontown, OH (US); Frank W. Harris, Boca Raton, FL (US); Hideo Umeda, Kobe (JP); Ritsuya Kawasaki, Kobe (JP); Toshihiko Katayama, Kobe (JP); Yusuke Inoue, Kobe (JP); Jun Okada, Kobe (JP); Mizuho Inoue, Kobe (JP); Manabu Naito, Kobe (JP)

(73) Assignees: AKRON POLYMER SYSTEMS, INC., Akron, OH (US); SUMITOMO BAKELITE CO., LTD., Shinagawa-ku (JP)

( * ) Notice: Subject to any disclaimer, the term of this patent is extended or adjusted under 35 U.S.C. 154(b) by 525 days.

(21) Appl. No.: 14/503,805

(22) Filed: Oct. 1, 2014

(65) Prior Publication Data
US 2015/0099131 A1    Apr. 9, 2015

Related U.S. Application Data

(60) Provisional application No. 61/886,909, filed on Oct. 4, 2013.

(51) Int. Cl.
| | | |
|---|---|---|
| C08G 69/32 | (2006.01) | |
| C08G 69/08 | (2006.01) | |
| G02B 1/10 | (2015.01) | |
| C09D 177/10 | (2006.01) | |
| C08L 77/10 | (2006.01) | |

(52) U.S. Cl.
CPC .......... *C08G 69/08* (2013.01); *C08G 69/32* (2013.01); *C09D 177/10* (2013.01); *G02B 1/10* (2013.01); *C08L 77/10* (2013.01); *Y10T 428/31623* (2015.04); *Y10T 428/31725* (2015.04)

(58) Field of Classification Search
CPC ......... C08G 69/08; C08G 69/32; C08L 77/10; Y10T 428/31623; Y10T 428/31725; G02B 1/10; C09D 177/10
See application file for complete search history.

(56) References Cited

U.S. PATENT DOCUMENTS

| | | |
|---|---|---|
| 2014/0083624 A1 | 3/2014 | Harris et al. |
| 2014/0084499 A1 | 3/2014 | Harris et al. |
| 2014/0159264 A1 | 6/2014 | Harris et al. |
| 2014/0175683 A1 | 6/2014 | Harris et al. |
| 2014/0234532 A1 | 8/2014 | Umeda et al. |
| 2014/0299264 A1 | 10/2014 | Umeda et al. |
| 2014/0305597 A1 | 10/2014 | Harris et al. |
| 2014/0356636 A1 | 12/2014 | Sun et al. |

FOREIGN PATENT DOCUMENTS

| | | |
|---|---|---|
| JP | 62-176506 | 8/1987 |
| JP | 7-258406 | 10/1995 |
| JP | 8-269195 | 10/1996 |
| JP | 10-311987 A | 11/1998 |
| JP | 2001-291728 A | 10/2001 |
| JP | 2006-159636 | 6/2006 |
| JP | 2008-260266 A | 10/2008 |
| JP | 2011-184682 A | 9/2011 |
| WO | WO 2004/039863 | 5/2004 |
| WO | WO 2012/129422 | 9/2012 |

OTHER PUBLICATIONS

U.S. Appl. No. 14/626,440, filed Feb. 19, 2015, Harris, et al.
U.S. Appl. No. 14/849,065, filed Sep. 9, 2015, Sun, et al.
U.S. Appl. No. 14/848,995, filed Sep. 9, 2015, Sun, et al.
International Search Report dated Jan. 6, 2015 in PCT/JP2014/075951.
U.S. Appl. No. 14/724,299, filed May 28, 2015, Kawasaki, et al.
U.S. Appl. No. 14/814,631, filed Jul. 31, 2015, Katayama, et al.
U.S. Appl. No. 14/818,431, filed Aug. 5, 2015, Sun, et al.
U.S. Appl. No. 14/523,074, filed Oct. 24, 2014, Sun, et al.
U.S. Appl. No. 14/520,921, filed Oct. 22, 2014, Sun, et al.
U.S. Appl. No. 14/505,971, filed Oct. 3, 2014, Sun, et al.
U.S. Appl. No. 14/506,040, filed Oct. 3, 2014, Sun, et al.

*Primary Examiner* — Callie Shosho
*Assistant Examiner* — John Freeman
(74) *Attorney, Agent, or Firm* — Oblon, McClelland, Maier & Neustadt, L.L.P.

(57) ABSTRACT

The present disclosure, in one aspect, relates to a polyamide solution including an aromatic polyamide and a solvent, wherein the aromatic polyamide includes at least two types of constitutional units, and a change rate of coefficient of thermal expansion (CTE) of a cast film produced by casting the polyamide solution on a glass plate and CTE of the same cast film after being subjected to a heat treatment at temperature of 200° C. to 450° C. (=CTE after heat treatment/CTE before heat treatment) is 1.3 or less.

20 Claims, 3 Drawing Sheets

SOLUTION OF AROMATIC POLYAMIDE FOR MANUFACTURING DISPLAY ELEMENT, OPTICAL ELEMENT, ILLUMINATION ELEMENT OR SENSOR ELEMENT

CROSS-REFERENCE TO RELATED APPLICATIONS

The present application is based upon and claims the benefit of priority to U.S. Application No. 61/886,909, filed Oct. 4, 2013, the entire contents of which are incorporated herein by reference.

TECHNICAL FIELD

The present disclosure, in one aspect, relates to a polyamide solution including an aromatic polyamide and a solvent. Specifically, the present disclosure relates to a polyamide solution wherein the aromatic polyamide comprises at least two types of constitutional units and wherein a change rate of coefficient of thermal expansion (CTE) before and after the thermal treatment does not exceed a predetermined value. The present disclosure, in another aspect, relates to a laminated composite material including a glass plate and a polyamide resin layer, wherein the polyamide resin layer is laminated on one surface of the glass plate. The polyamide resin layer is obtained by applying the polyamide solution onto the glass plate. The present disclosure, in another aspect, relates to a method for manufacturing a display element, an optical element, an illumination element or a sensor element, including a step of forming a polyamide film using the polyamide solution.

BACKGROUND ART

As transparency is required for display elements, glass substrates using glass plates have been used as substrates for the elements (JP10311987 (A)). However, for display elements using glass substrates, problems such as being heavy in weight, breakable and unbendable have been pointed out at times. Thus, use of a transparent resin film instead of a glass substrate has been proposed.

For example, polycarbonates, which have high transparency, are known as transparent resins for use in optical applications. However, their heat resistance and mechanical strength may not be sufficient to be used for manufacturing display elements. On the other hand, examples of heat resistant resins include polyimides. However, typical polyimides are brown-colored, and thus it may not be suitable for use in optical applications. As polyimides with transparency, those having an alicyclic ring structure are known. However, the problem with such polyimides is that they have poor heat resistance.

For polyamide films for use in optical applications, WO 20041039863 and JP 2008260266(A) each discloses an aromatic polyamide having diamine including a trifluoro group, which provides both high stiffness and heat resistance.

WO 2012/129422 discloses a transparent polyamide film with thermal stability and dimension stability. This transparent film is manufactured by casting a solution of aromatic polyamide and curing at a high temperature. The document discloses that the cured film has a transmittance of more than 80% over a range of 400 to 750 nm, a coefficient of thermal expansion (CTE) of less than 20 ppm/° C., and shows favorable solvent resistance. And the document discloses that the film can be used as a flexible substrate for a microelectronic device.

SUMMARY

The present disclosure, in one aspect, relates to a polyamide solution comprising an aromatic polyamide and a solvent, wherein the aromatic polyamide comprises at least two types of constitutional units, and a change rate of coefficient of thermal expansion (CTE) of a cast film produced by casting the polyamide solution on a glass plate and CTE of the same cast film after being subjected to a heat treatment at temperature of 200° C. to 450° C. (=CTE after heat treatment/CTE before heat treatment) is 1.3 or less.

The present disclosure, in one aspect, further relates to a laminated composite material, comprising a glass plate, an organic resin layer and an inorganic resin layer, wherein the organic resin layer and the inorganic resin layer are laminated on one surface of the glass plate, and wherein the organic resin is a polyamide resin formed by casting the polyamide solution according to the present disclosure on a glass plate.

In another aspect, the present disclosure relates to a method for manufacturing a display element, an optical element, an illumination element or a sensor element on a surface of the polyamide resin layer of the laminated composite material, i.e, a surface opposite to the surface facing the glass plate. Further in one aspect, the present invention relates to a display element, an optical element, an illumination element or a sensor element manufactured by the method.

DETAILED DESCRIPTION

Figure 1:
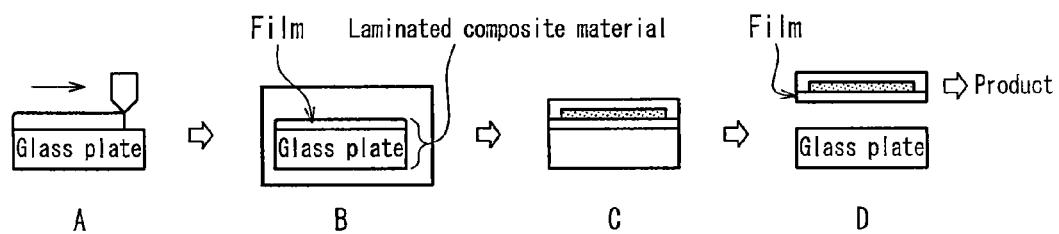
FIG. 1 is a flow chart for explaining a method for manufacturing an OLED element or a sensor element according to one embodiment.

A display element, an optical element, or an illumination element such as an organic electro-luminescence (OEL) or organic light-emitting diode (OLED) is often produced by the method as described in FIG. 1. Briefly, a polymer solution (varnish) is applied or casted onto a glass base or a silicon wafer base (step A), the applied polymer solution is cured to form a film (step B), an element such as OLED is formed on the film (step C), and then, the element such as OLED (product) is de-bonded from the base (step D). These days, polyimide film is used as the film in the method in FIG. 1.

A sensor element used for an input device such as an image pickup device also is manufactured often by the process described in FIG. 1. Briefly, a polymer solution (varnish) is applied onto a base (glass or silicon wafer) (step A), the applied polymer solution is cured to form a film (step B), a photoelectric conversion element and its driver element are formed on the film (step C), and then, the sensor element is de-bonded from the base (step D).

In the method for manufacturing the display element, the optical element, the illumination element or the sensor element as illustrated in FIG. 1, there has been found a problem that, even when no warpage occurs in the laminated composite material including the glass plate and the film obtained in the step B, warpage deformation occurs during the heat treatment in the step of forming elements such as OLED in the step C, which degrades the quality and the yield. Namely, when warpage deformation occurs in the laminated composite material, conveyance during a manufacturing process will be difficult. In addition, as the exposure intensity changes during a patterning production, production of uniform pattern would be difficult, and/or cracks would develop easily in a case of laminating an inorganic barrier layer.

Figure 2:
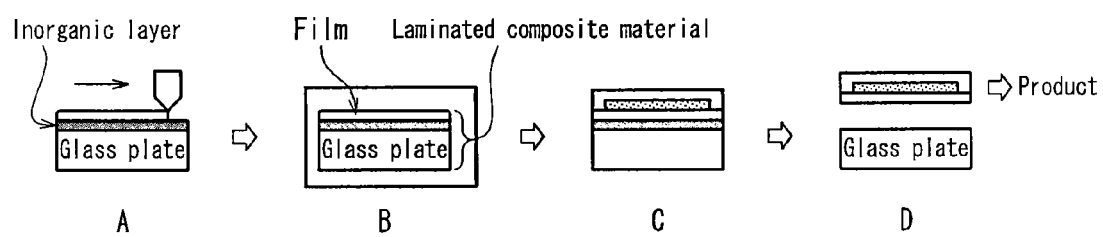
FIG. 2 is a flow chart for explaining a method for manufacturing an OLED element or a sensor element according to one embodiment.

The present disclosure has a basis on a finding that in one or a plurality of embodiments, an aim of suppressing warpage deformation that can occur in the step C of FIG. 2, i.e., suppressing warpage deformation caused by the heat treatment (for example, heat treatment at temperature of 200° C. to 450° C.) in the steps of manufacturing the elements or the like after manufacturing the laminated composite material can be achieved by use of a polyamide solution that can decrease the change rate of the coefficient of thermal expansion (CTE) before and after treating the cast film with heat.

Therefore, in one or a plurality of embodiments, the present disclosure relates to a polyamide solution that includes an aromatic polyamide and a solvent, wherein the aromatic polyamide comprises at least two types of constitutional units and the change rate of coefficient of thermal expansion (CTE) of a cast film produced by casting the polyamide solution on a glass plate and the same cast film after being subjected to a heat treatment at temperature of 200° C. to 450° C. (=CTE after heat treatment/CTE before heat treatment) is 1.3 or less. Further, in one or a plurality of embodiments, the present disclosure relates to a polyamide solution that is capable of suppressing warpage deformation of a laminated composite material in a step of manufacturing elements such as a display element, an optical element, an illumination element and a sensor element.

In the present disclosure, the term "a cast film produced by casting a polyamide solution on a glass plate" refers to a film obtained by applying the polyamide solution according to the present disclosure onto a flat glass base, and drying, and if necessary curing the applied solution. Specifically, the cast film refers to a film produced by the film formation method disclosed in Examples.

In the present disclosure, "CTE change rate" refers to a ratio of CTE of a cast film produced by casting a polyamide solution according to the present disclosure on a glass plate (this is stated also as CTE before heat treatment) to CTE after subjecting the film to a heat treatment (this is stated also as CTE after heat treatment) (=(CTE after heat treatment)/(CTE before heat treatment)). The CTE measurement can be conducted by a method disclosed in Examples. In one or a plurality of embodiments, the temperature for the heat treatment in a case of measuring the CTE change rate is the maximal temperature during the process of manufacturing elements such as the display element, the optical element, the illumination element, the sensor element and the like, and in one or a plurality of embodiment, it is in the range of 200° C. to 450° C., 250° C. to 400° C., or 300° C. to 350° C. In one or a plurality of embodiments, the time for the heat treatment can be in the range of 1 to 12 hours, 3 to 10 hours or 5 to 9 hours. In one or a plurality of embodiments, conditions for the heat treatment are 325° C., 8 hours.

The present disclosure is based on a finding that there is a correlation between the amount of warpage deformation and the CTE change rate of the laminated composite material in the steps of manufacturing the elements such as the display element, the optical element, the illumination element, the sensor element and the like. That is, by decreasing the CTE change rate, the warpage deformation can be suppressed.

[CTE Change Rate]

From the viewpoint of suppressing warpage deformation in the laminated composite material in the process of manufacturing a display element, an optical element, an illumination element, a sensor element and the like, the CTE change rate is 1.3 or less. In one or a plurality of embodiments, it is 1.28 or less, or 1.26 or less. In one or a plurality of embodiments, the CTE change rate can be measured by the method as described in Examples.

[Glass Transition Temperature (Tg)]

In one or a plurality of embodiments, regarding the polyamide solution according to the present disclosure, the cast film produced by casting the polyamide solution of the present disclosure on a glass plate has a glass transition temperature (Tg) of 365° C. or higher, 370° C. or higher, or 380° C. or higher, from the viewpoint of suppressing warpage deformation of the laminated composite material in the process of manufacturing elements such as a display element, an optical element, an illumination element, a sensor element and the like, and from the viewpoint of decreasing the CTE change rate. In one or a plurality of embodiments, the glass transition temperature (Tg) can be measured by the method as described in Examples.

[CTE]

In one or a plurality of embodiments, regarding the polyamide solution according to the present disclosure, the cast film produced by casting the polyamide solution of the present disclosure on a glass plate has CTE of 20.0 ppm/° C. or more, 22 ppm/° C. or more, or, 24 ppm/° C. or more from the viewpoint of suppressing warpage deformation of the laminated composite material in the process of manufacturing elements such as a display element, an optical element, an illumination element, a sensor element and the like, and from the viewpoint of decreasing the CTE change rate. In one or a plurality of embodiments, CTE can be measured by the method as described in Examples.

[Total Light Transmittance]

In one or a plurality of embodiments, regarding the polyamide solution according to the present disclosure, from the viewpoint of use in the step of manufacturing elements such as a display element, an optical element, an illumination element, a sensor element and the like, the total light transmittance of the cast film produced by casting the solution on a glass plate is 80% or more, 85% or more, or 90% or more.

[Rigid Component]

In one or a plurality of embodiments, regarding the polyamide solution according to the present disclosure, from the viewpoint of suppressing warpage deformation of the laminated composite material in a process of manufacturing elements such as a display element, an optical element, an illumination element, a sensor element and the like, and from the viewpoint of decreasing the CTE change rate, it is preferable that the aromatic polyamide contained in the polyamide solution has a constitutional unit as a rigid component. In one or a plurality of embodiments, it is preferable that the percentage of the constitutional unit as the rigid component with respect to the total constitutional units that constitutes the aromatic polyamide exceeds 35.0 mol % from the similar viewpoint. More preferably, it is 40.0 mol % or more, further preferably 50.0 mol % or more, and even further preferably 55.0 mol % or more. Regarding the polyamide solution according to the present disclosure, from the viewpoint of using the film for a display element, an optical element, an illumination element or a sensor element, in one or a plurality of embodiments, the percentage of the constitutional unit as the rigid component with respect to the total constitutional units constituting the aromatic polyamide is 95% or less, 90% or less, 80% or less, or, 70% or less.

The aromatic polyamide having the constitutional unit as a rigid component in the above-mentioned range can be synthesized by setting the monomer as the rigid component to be within the above-mentioned range with respect to the total monomers used for synthesis, in one or a plurality of embodiments. Therefore, regarding the polyamide solution according to the present disclosure, from the viewpoint of suppressing warpage deformation of the laminated composite material in the process of manufacturing the elements such as the display element, the optical element, the illumination element, the sensor element and the like, and from the viewpoint of decreasing the CTE change rate, in one or a plurality of embodiments, it is preferable that the percentage of the monomer as the rigid component with respect to the total monomer used for synthesis of the aromatic polyamide exceeds 35.0 mol %. More preferably, the percentage is 40.0 mol % or more, further preferably 50.0 mol % or more, and even further preferably 55.0 mol %. Regarding the polyamide solution according to the present disclosure, from the viewpoint of using the film for a display element, an optical element, an illumination element or a sensor element, in one or a plurality of embodiments, the percentage of the monomer as the rigid component with respect to the total monomers used for synthesis of the aromatic polyamide is 95% or less, 90% or less, 80% or less, or, 70% or less.

In the present disclosure, in one or a plurality of embodiments, it is preferable in general that the constitutional unit or monomer as the rigid component is a para-oriented molecule and it is more preferable that the constitutional unit or monomer does not include an ether group, a trifluoromethyl (CF$_3$) group and an alkyl group. In one or a plurality of non-limited embodiments, examples of the monomer as the rigid component include: 9,9-bis(4-aminophenyl)fluorene (FDA), 9,9-bis(3-fluoro-4-aminophenyl)fluorene (FFDA), telephthaloyl dichloride (TPC), and 4,4'-biphenyldicarbonyl dichloride (BPDC).

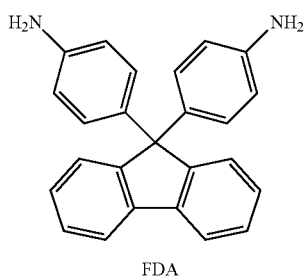

FDA

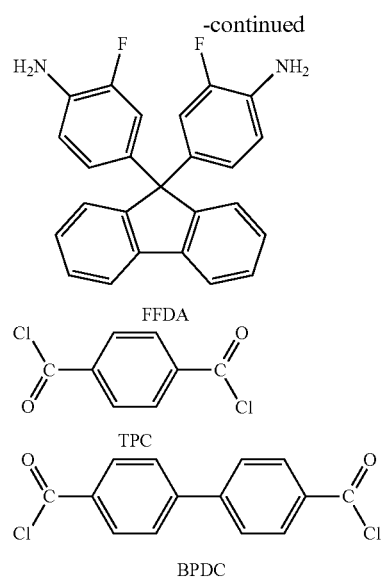

FFDA

TPC

BPDC

In one or a plurality of embodiments, from the viewpoint of using the film for a display element, an optical element, an illumination element or a sensor element and from the viewpoint of decreasing the CTE change rate, the aromatic polyamide in the polyamide solution according to the present disclosure may be an aromatic polyamide having repeat units represented by the general formulae (I) and (II) below.

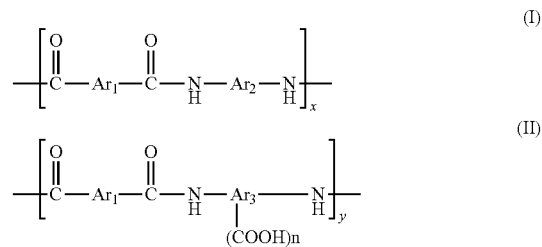

wherein x represents mol % of the constitutional unit (I), y represents mol % of the constitutional unit in the formula (II), x varies from 90 to 99.99%, and y varies from 10 to 0.01 mol %, and wherein n=1 to 4. In the formulae (I) and (II), Ar$_1$ is selected from the group consisting of:

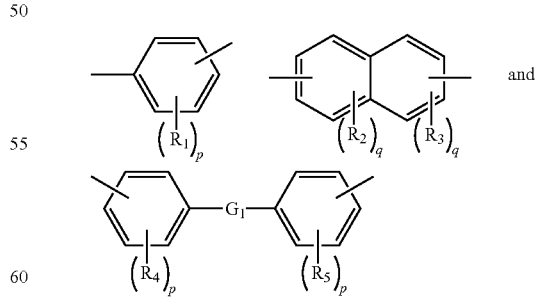

wherein p=4, q=3, and wherein R$_1$, R$_2$, R$_3$, R$_4$, R$_5$ are selected from the group consisting of hydrogen, halogen (fluorine, chlorine, bromine, and iodine), alkyl, substituted alkyl such as halogenated alkyl, nitro, cyano, thioalkyl, alkoxy, substituted alkoxy such as halogenated alkoxy, aryl, substituted aryl such as halogenated aryl, alkyl ester, and substituted alkyl ester such as halogenated alkyl ester, and combinations thereof. $G_1$ is selected from the group consisting of a covalent bond; a $CH_2$ group; a $C(CH_3)_2$ group; a $C(CF_3)_2$ group; a $C(CX_3)_2$ group, where X is a halogen; a CO group; an O atom; a S atom; a $SO_2$ group; a Si $(CH_3)_2$ group; 9,9-fluorene group; substituted 9,9-fluorene group; and an OZO group, where Z is an aryl group or substituted aryl group, such as phenyl group, biphenyl group, perfluorobiphenyl group, 9,9-bisphenylfluorene group, and substituted 9,9-bisphenylfluorene group;

In the formula (I), $Ar_2$ is selected from the group of comprising:

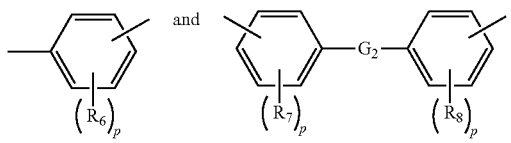

wherein p=4, wherein $R_6$, $R_7$, $R_8$ are selected from the group consisting of hydrogen, halogen (fluorine, chlorine, bromine, and iodine), alkyl, substituted alkyl such as halogenated alkyl, nitro, cyano, thioalkyl, alkoxy, substituted alkoxy such as halogenated alkoxy, aryl, substituted aryl such as halogenated aryl, alkyl ester, and substituted alkyl ester such as halogenated alkyl ester, and combinations thereof. $G_2$ is selected from the group consisting of a covalent bond; a $CH_2$ group; a $C(CH_3)_2$ group; a $C(CF_3)_2$ group; a $C(CX_3)_2$ group, where X is a halogen; a CO group; an O atom; a S atom; a $SO_2$ group; a Si $(CH_3)_2$ group; 9,9-fluorene group; substituted 9,9-fluorene group; and an OZO group, where Z is an aryl group or substituted aryl group, such as phenyl group, biphenyl group, perfluorobiphenyl group, 9,9-bisphenylfluorene group, and substituted 9,9-bisphenylfluorene group;

In the formula (II), $Ar_3$ is selected from the group consisting of:

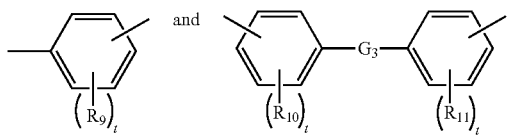

wherein t=0 to 3, wherein $R_9$, $R_{10}$, $R_{11}$ are selected from the group consisting of hydrogen, halogen (fluorine, chlorine, bromine, and iodine), alkyl, substituted alkyl such as halogenated alkyl, nitro, cyano, thioalkyl, alkoxy, substituted alkoxy such as halogenated alkoxy, aryl, substituted aryl such as halogenated aryl, alkyl ester, and substituted alkyl ester such as halogenated alkyl ester, and combinations thereof. $G_3$ is selected from the group consisting of a covalent bond; a $CH_2$ group; a $C(CH_3)_2$ group; a $C(CF_3)_2$ group; a $C(CX_3)_2$ group, where X is a halogen; a CO group; an O atom; a S atom; a $SO_2$ group; a Si $(CH_3)_2$ group; 9,9-fluorene group; substituted 9,9-fluorene group; and an OZO group, where Z is an aryl group or substituted aryl group, such as phenyl group, biphenyl group, perfluorobiphenyl group, 9,9-bisphenylfluorene group, and substituted 9,9-bisphenylfluorene group.

In one or a plurality of embodiments of the present disclosure, (I) and (II) are selected so that the polyamide is soluble in a polar solvent or a mixed solvent comprising one or more polar solvents. In one or a plurality of embodiments of the present disclosure, x varies from 90.0 to 99.99 mol % of the repeat structure (I), and y varies from 10.0 to 0.01 mol % of the repeat structure (II). In one or a plurality of embodiments of the present disclosure, x varies from 90.1 to 99.9 mol % of the repeat structure (I), and y varies from 9.9 to 0.1 mol % of the repeat structure (II). In one or a plurality of embodiments of the present disclosure, x varies from 91.0 to 99.0 mol % of the repeat structure (I), and y varies from 9.0 to 1.0 mol % of the repeat structure (II). In one or a plurality of embodiments of the present disclosure, x varies from 92.0 to 98.0 mol % of the repeat structure (I), and y varies from 8.0 to 2.0 mol % of the repeat structure (II). In one or a plurality of embodiments of the present disclosure, $Ar_1$, $Ar_2$, and $Ar_3$ include the same or different repeat units (I) and (II).

In one or a plurality of embodiments, from the viewpoint of using the film for a display element, an optical element, an illumination element or a sensor element, and from the viewpoint of decreasing the CTE change rate, the polyamide solution according to the present disclosure is one obtained or obtainable by a manufacturing method including the following steps. However, the polyamide solution according to the present disclosure is not limited to one manufactured by the following method.

a) dissolving at least one aromatic diamine in a solvent;
b) reacting a mixture of the at least one aromatic diamine with at least one aromatic diacid dichloride, thereby generating hydrochloric acid and a polyamide solution;
c) removing the free hydrochloric acid by reaction with a trapping reagent.

In one or a plurality of embodiments of the method for manufacturing a polyamide solution of the present disclosure, the aromatic diacid dichloride includes those shown in the following general structures:

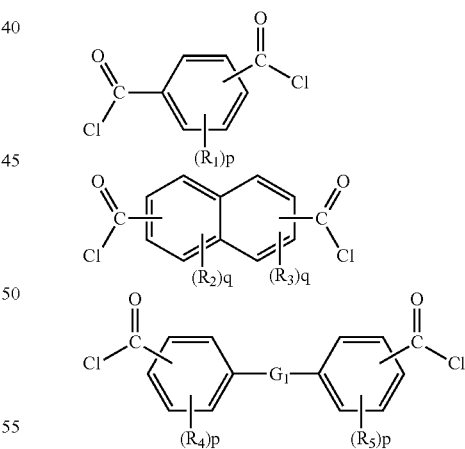

wherein p=4, q=3, and wherein $R_1$, $R_2$, $R_3$, $R_4$, $R_5$ are selected from the group consisting of hydrogen, halogen (fluorine, chlorine, bromine, and iodine), alkyl, substituted alkyl such as halogenated alkyl, nitro, cyano, thioalkyl, alkoxy, substituted alkoxy such as a halogenated alkoxy, aryl, or substituted aryl such as halogenated aryl, alkyl ester and substituted alkyl ester such as halogenated alkyl ester, and combinations thereof. It is to be understood that each $R_1$ can be different, each $R_2$ can be different, each $R_3$ can be different, each $R_4$ can be different, and each $R_5$ can be different. $G_1$ is selected from the group consisting of a covalent bond; a $CH_2$ group; a $C(CH_3)_2$ group; a $C(CF_3)_2$ group; a $C(CX_3)_2$ group, where X is a halogen; a CO group; an O atom; a S atom; a $SO_2$ group; a Si $(CH_3)_2$ group; 9,9-fluorene group; substituted 9,9-fluorene group; and an OZO group, where Z is an aryl group or substituted aryl group, such as phenyl group, biphenyl group, perfluorobiphenyl group, 9,9-bisphenylfluorene group, and substituted 9,9-bisphenylfluorene group.

In one or a plurality of embodiments, from the viewpoint of using the film in a display element, an optical element, an illumination element or a sensor element, and from the viewpoint of decreasing the CTE change rate, examples of the aromatic diacid dichloride used in the method for manufacturing the polyamide solution according the present disclosure include the following.

Terephthaloyl dichloride (TPC);

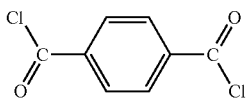

isophthaloyl dichloride (IPC);

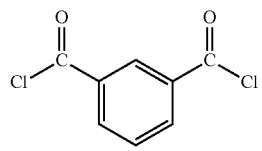 [SMILES: O=C(Cl)c1cccc(C(=O)Cl)c1]

2,6-naphthaloyl dichloride (NDC);

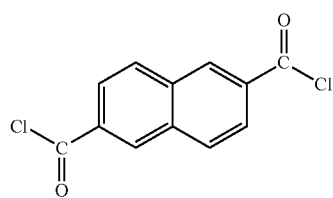 [SMILES: O=C(Cl)c1ccc2cc(C(=O)Cl)ccc2c1]

4,4'-biphenyldicarbonyl dichloride (BPDC)

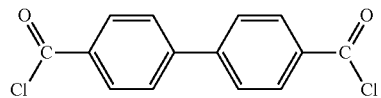

In one or a plurality of embodiments of the method for manufacturing a polyamide solution of the present disclosure, the aromatic diamine includes those shown in the following general structures:

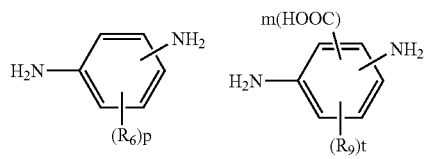

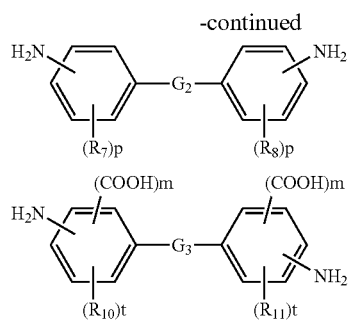

wherein p=4, m=1 or 2, and t=1 to 3, wherein $R_6$, $R_7$, $R_8$, $R_9$, $R_{10}$, $R_{11}$ are selected from the group consisting of hydrogen, halogen (fluorine, chlorine, bromine, and iodine), alkyl, substituted alkyl such as halogenated alkyl, nitro, cyano, thioalkyl, alkoxy, substituted alkoxy such as a halogenated alkoxy, aryl, substituted aryl such as halogenated aryl, alkyl ester, and substituted alkyl ester such as halogenated alkyl ester, and combinations thereof. It is to be understood that each $R_6$ can be different, each $R_7$ can be different, each $R_8$ can be different, each $R_9$ can be different, each $R_{10}$ can be different, and each $R_{11}$ can be different. $G_2$ and $G_3$ are selected from the group consisting of a covalent bond; a $CH_2$ group; a $C(CH_3)_2$ group; a $C(CF_3)_2$ group; a $C(CX_3)_2$ group, where X is a halogen; a CO group; an O atom; a S atom; a $SO_2$ group; a Si $(CH_3)_2$ group;9,9-fluorene group; substituted 9,9-fluorene group; and an OZO group, where Z is an aryl group or substituted aryl group, such as phenyl group, biphenyl group, perfluorobiphenyl group, 9,9-bisphenylfluorene group, and substituted 9,9-bisphenylfluorene group.

In one or a plurality of embodiments, from the viewpoint of using the film in a display element, an optical element, an illumination element or a sensor element, and from the viewpoint of decreasing the CTE change rate, examples of the aromatic diamine used in the method for manufacturing the polyamide solution according the present disclosure include the following.

4,4'-Diamino-2,2'-bistrifluoromethylbenzidine (PFMB);

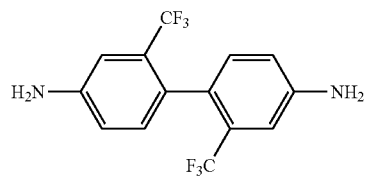 [SMILES: Nc1ccc(-c2ccc(N)cc2C(F)(F)F)c(C(F)(F)F)c1]

9,9-bis(4-aminophenyl)fluorene (FDA);

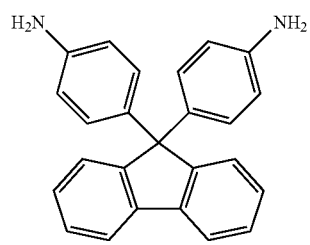 [SMILES: Nc1ccc(C2(c3ccc(N)cc3)c3ccccc3-c3ccccc32)cc1]

9,9-bis(3-fluoro-4-aminophenyl)fluorene (FFDA);

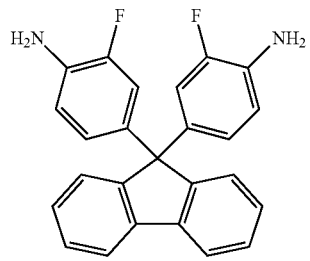 [SMILES: Nc1ccc(C2(c3ccc(N)c(F)c3)c3ccccc3-c3ccccc32)cc1F]

4,4'-diaminodiphenyl sulfone (DDS)

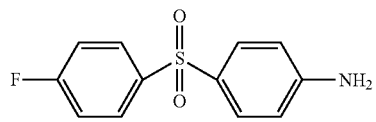

Here, DDS may be 4,4'-type, 3,3'-type or 2,2'-type.
4,4'-Diaminodiphenic acid (DADP);

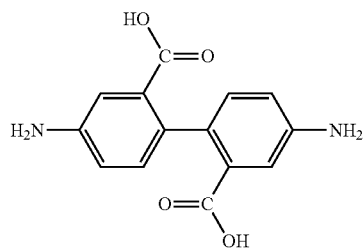 [SMILES: Nc1ccc(-c2ccc(N)cc2C(=O)O)c(C(=O)O)c1]

3,5-diaminobenzoic acid (DAB);

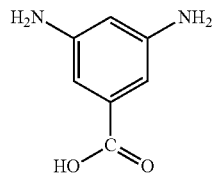

4,4'-diamino-2,2'-bistrifluoromethoxylbenzidine (PFMOB);

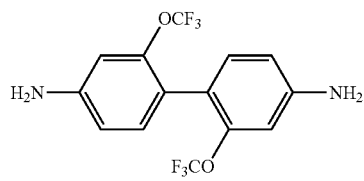 [SMILES: Nc1ccc(-c2ccc(N)cc2OC(F)(F)F)c(OC(F)(F)F)c1]

4,4'-diamino-2,2'-bistrifluoromethyldiphenyl ether (6FODA);

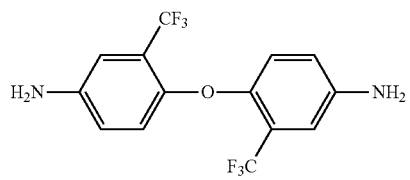 [SMILES: Nc1ccc(Oc2ccc(N)cc2C(F)(F)F)c(C(F)(F)F)c1]

bis(4-amino-2-trifluoromethylphenyloxyl) benzene (6FOQDA);

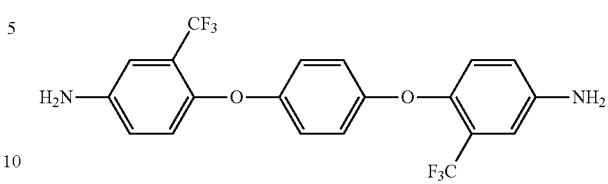

bis(4-amino-2-trifluoromethylphenyloxyl) biphenyl (6FOBDA)

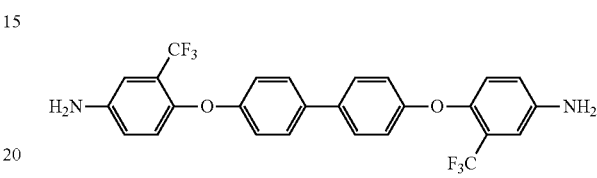

In one or a plurality of embodiments of the method for manufacturing a polyamide solution of the present disclosure, a polyamide is produced via a condensation polymerization in a solvent, where the hydrochloric acid generated in the reaction is trapped by a reagent like propylene oxide (PrO).

In one or a plurality of embodiments of the present disclosure, from the viewpoint of use of the polyamide solution in the method for manufacturing a display element, an optical element, an illumination element or a sensor element, the reaction of hydrochloric acid with the trapping reagent yields a volatile product.

In one or a plurality of embodiments of the present disclosure, from the viewpoint of use of the polyamide solution in the method for manufacturing a display element, an optical element, an illumination element or a sensor element, the trapping reagent is propylene oxide (PrO). In one or a plurality of embodiments of the present disclosure, the reagent is added to the mixture before or during the reacting step (b). Addition of the reagent before or during the reaction step (b) can reduce degree of viscosity and generation of lumps in the mixture after the reaction step (b), and therefore, can improve productivity of the polyamide solution. These effects are significant specifically when the reagent is organic reagent, such as propylene oxide.

In one or a plurality of embodiments of the present disclosure, from the viewpoint of enhancement of heat resistance property of the polyamide film, the method further comprises the step of end-capping of one or both of terminal —COOH group and terminal —NH$_2$ group of the polyamide. The terminal of the polyamide can be end-capped by the reaction of polymerized polyamide with benzoyl chloride when the terminal of polyamide is —NH$_2$, or reaction of polymerized polyamide with aniline when the terminal of polyamide is —COOH. However, the method of end-capping is not limited to this method.

In one or a plurality of embodiments of the present disclosure, from the viewpoint of use of the polyamide solution in the method for manufacturing a display element, an optical element, an illumination element or a sensor element, the polyamide is first isolated from the polyamide solution by precipitation (hereinafter, it is referred also as re-precipitation) and re-dissolution in the solvent. The re-precipitation can be carried out by a typical method. In one or a plurality of embodiments, by adding the polyamide to methanol, ethanol, isopropyl alcohol or the like, it is precipitated, cleaned, and re-dissolved in the solvent, for example.

In one or a plurality of embodiments of the present disclosure, from the viewpoint of use of the polyamide solution in the method for manufacturing a display element, an optical element, an illumination element or a sensor element, the polyamide solution is produced in the absence of inorganic salt.

In one or a plurality of embodiments, from the viewpoint of using the film in a display element, an optical element, an illumination element or a sensor element and from the viewpoint of decreasing the CTE change rate, the aromatic polyamide of the polyamide solution according to the present disclosure has rigidity. In the present disclosure, an aromatic polyamide having rigidity indicates that in one or a plurality of embodiments, the constitutional units of the polyamide include a constitutional unit as a rigid component; or it is a polyamide synthesized by using an aromatic monomer component having rigidity.

[Average Molecular Weight of Polyimide]

In one or a plurality of embodiments, from the viewpoint of using the film in a display element, an optical element, an illumination element or a sensor element and suppressing whitening, it is preferable that the aromatic polyamide of the polyamide solution according to the present disclosure has a number average molecular weight (Mn) of $6.0 \times 10^4$ or more, $6.5 \times 10^4$ or more, $7.0 \times 10^4$ or more, $7.5 \times 10^4$ or more, or $8.0 \times 10^4$ or more. From a similar viewpoint, in one or a plurality of embodiments, the number average molecular weight is $1.0 \times 10^6$ or less, $8.0 \times 10^5$ or less, $6.0 \times 10^5$ or less, or $4.0 \times 10^5$ or less.

In the present disclosure, the number average molecular weight (Mn) and the weight-average molecular weight (Mw) of the polyamide are measured by Gel Permeation Chromatography, and more specifically, they are measured by a method described in Examples.

In one or a plurality of embodiments, from the viewpoint of using the film in a display element, an optical element, an illumination element or a sensor element and from the viewpoint of suppressing whitening, it is preferable that the molecular weight distribution (=Mw/Mn) of the aromatic polyamide of the polyamide solution according to the present disclosure is 5.0 or less, 4.0 or less, 3.0 or less, 2.8 or less, 2.6 or less, or 2.4 or less. From a similar viewpoint, in one or a plurality of embodiments, the molecular weight distribution of the aromatic polyamide is 2.0 or more.

In one or a plurality of embodiments, from the viewpoint of using the film in a display element, an optical element, an illumination element or a sensor element, the polyamide solution according to the present disclosure is one undergone re-precipitation after the synthesis of the polyamide.

In one or a plurality of embodiments, at least one of the terminal —COOH group and terminal —NH$_2$ group of the aromatic polyamide is end-capped. From the viewpoint of enhancing the heat resistance of the polyamide film, it is preferred that the terminal is end-capped. The terminal of the polyamide can be end-capped by the reaction of polymerized polyamide with benzoyl chloride when the terminal of polyamide is —NH$_2$, or reaction of polymerized polyamide with aniline when the terminal of polyamide is —COOH. However, the method of end-capping is not limited to this method.

Regarding the polyamide solution according to the present disclosure, in one or a plurality of embodiments, from the viewpoint of using the film in a display element, an optical element, an illumination element or a sensor element, the monomer used for synthesis of polyamide may include a carboxyl group-containing diamine monomer. In such a case, in one or a plurality of embodiments, the content of the carboxyl group-containing diamine monomer ingredient with respect to the total amount of the monomer may be 30 mol % or less, 20 mol % or less, or, 1 to 10 mol %.

[Solvent]

In one or a plurality of embodiments of the present disclosure, from the viewpoint of enhancement of solubility of the polyamide to the solvent, the solvent is a polar solvent or a mixed solvent comprising one or more polar solvents. In one embodiment of the present disclosure, from the viewpoint of enhancement of solubility of the polyamide to the solvent, the polar solvent is methanol, ethanol, propanol, isopropanol (IPA), butanol, acetone, methyl ethyl ketone (MEK), methyl isobutyl ketone (MIBK), toluene, cresol, xylene, propylene glycol monomethyl ether acetate (PGMEA), N,N-dimethylacetamide (DMAc), N-methyl-2-pyrrolidone (NMP), dimethylsulfoxide (DMSO), butyl cellosolve, γ-butyrolactone, α-methyl-γ-butyrolactone, methyl cellosolve, ethyl cellosolve, ethylene glycol monobutyl ether, diethylene glycol monobutyl ether, N,N-dimethylformamide (DMF), a combination thereof, or a mixed solvent comprising at least one of the polar solvents.

[Content of Polyamide]

In one or a plurality of embodiments, the content of the aromatic polyamide in the polyamide solution according to the present disclosure may be 2% by weight or more, 3% by weight or more, or, 5% by weight or more from the viewpoint of use of the film for a display element, an optical element, an illumination element or a sensor element, and from the viewpoint of decreasing the CTE change rate. From a similar viewpoint, it may be 30% by weight or less, 20% by weight or less, or, 15% by weight or less.

In one or a plurality of embodiments, the polyimide solution according to the present disclosure is a polyamide solution for use in a method for manufacturing a display element, an optical element, an illumination element or a sensor element, including the steps a) to c).

a) applying a solution of an aromatic polyamide onto a base;

b) forming a polyamide film on the base after the applying step (a); and c) forming the display element, the optical element, the illumination element, or the sensor element, on the surface of polyamide film.

Here, the base or the surface of the base is composed of glass or silicon wafer.

[Laminated Composite Material]

The term "laminated composite material" as used herein refers to a material in which a glass plate and a polyamide resin layer are laminated. In one or a plurality of non-limiting embodiments, a glass plate and a polyamide resin layer being laminated indicates that the glass plate and the polyamide resin layer are laminated directly. Alternatively, in one or a plurality of non-limiting embodiments, it indicates that the glass plate and the polyamide resin layer are laminated via one or a plurality of layers. In the present disclosure, the organic resin of the organic resin layer is a polyamide resin. Therefore in one or a plurality of embodiments, the laminated composite material in the present disclosure includes a glass plate and a polyamide resin layer, i.e., a polyamide resin layer laminated on one surface of a glass plate.

In one or a plurality of non-limiting embodiments, the laminated composite material according to the present disclosure can be used in a method for manufacturing a display element, an optical element, an illumination element or a sensor element, such as the one illustrated in FIG. 1. Further, in one or a plurality of non-limiting embodiments, the laminated composite material according to the present disclosure can be used as a laminated composite material obtained in the step B of the manufacturing method illustrated in FIG. 1. Therefore, in one or a plurality of non-limiting embodiments, the laminated composite material according to the present disclosure is a laminated composite material to be used for a method for manufacturing a display element, an optical element, an illumination element or a sensor element, the method including forming a display element, an optical element or an illumination element, or a sensor element on a surface of the polyamide resin layer which is opposite to the surface facing the glass plate.

The laminated composite material according to the present disclosure may include additional organic resin layers and/or inorganic layers in addition to the polyamide resin layer. In one or a plurality of non-limiting embodiments, examples of additional organic resin layers include a flattened coat layer.

Further, in one or a plurality of non-limiting embodiments, examples of inorganic layers include a gas barrier layer capable of suppressing permeation of water or oxygen and a buffer coat layer capable of suppressing migration of ions to a TFT element.

FIG. 2 shows one or a plurality of non-limiting embodiments where an inorganic layer is formed between the glass plate and the polyamide resin layer. An example of the inorganic layer in this embodiment is an amorphous Si layer formed on the glass plate. In the step A, polyamide vanish is applied onto the amorphous Si layer on the glass plate, which is dried and/or cured in the step B thereby a laminated composite material is formed. In the step C, a display element, an optical element or an illumination element, or a sensor element is/are formed on the polyamide resin layer (polyamide film) of the laminated composite material, and in the step D, the amorphous Si layer is irradiated with a laser, thereby the display element, the optical element, the illumination element or the sensor element as the product (including the polyamide resin layer) is de-bonded from the glass plate.

Figure 3:
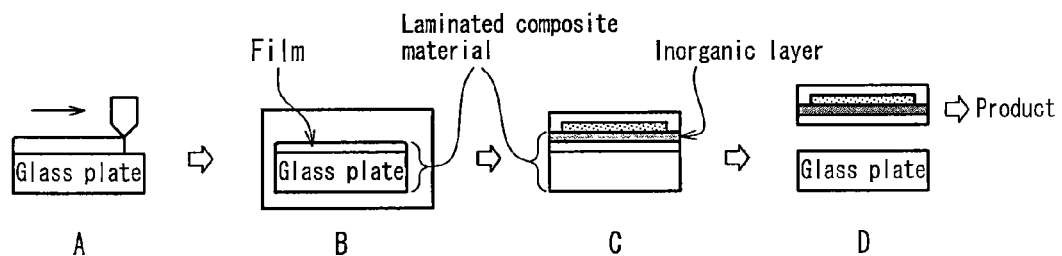
FIG. 3 is a flow chart for explaining a method for manufacturing an OLED element or a sensor element according to one embodiment.

FIG. 3 shows one or a plurality of non-limiting embodiments where an inorganic layer is formed on the surface of a polyamide resin layer which is opposite to the surface facing the glass plate. An example of the inorganic layer in this embodiment is an inorganic barrier layer. In the step A, a polyamide vanish is applied onto a glass plate, which is dried and/or cured in the step B thereby forming a laminated composite material. At this time, a further inorganic layer is formed on the polyamide resin layer (polyamide film) In one or a plurality of non-limiting embodiments, the laminated composite material in the present disclosure may include the inorganic layer (FIG. 3, step C). On this inorganic layer, a display element, an optical element, an illumination element, or sensor element is/are formed. In the step D, the polyamide resin layer is de-bonded so as to obtain a display element, an optical element, an illumination element or a sensor element as the product (including polyamide resin layer).

[Polyamide Resin Layer]

The polyamide resin of the polyamide resin layer of the laminated composite material according to the present disclosure can be formed using the polyamide solution according to the present disclosure.

[Thickness of Polyamide Resin Layer]

In one or a plurality of embodiments, from the viewpoint of using the film in a display element, an optical element, an illumination element or a sensor element and suppressing the development of cracks in the resin layer, the polyamide resin layer of the laminated composite material according to the present disclosure has a thickness of 500 µm or less, 200 µm or less, or 100 µm or less. Further, in one or a plurality of non-limiting embodiments, the polyamide resin layer has a thickness of 1 µm or more, 2 µm or more, or 3 µm or more, for example.

[Transmittance of Polyamide Resin Layer]

In one or a plurality of embodiments, the polyamide resin layer of the laminated composite material according to the present disclosure has a total light transmittance of 70% or more, 75% or more, or 80% or more from the viewpoint of allowing the laminated composite material to be used suitably in manufacturing a display element, an optical element, an illumination element or a sensor element.

[Glass Plate]

In one or a plurality of embodiments, from the viewpoint of using the film in a display element, an optical element, an illumination element or a sensor element, the material of the glass plate of the laminated composite material according to the present disclosure may be, for example, soda-lime glass, none-alkali glass or the like.

In one or a plurality of embodiments, from the viewpoint of using the film in a display element, an optical element, an illumination element or a sensor element, the glass plate of the laminated composite material according the present disclosure has a thickness of 0.3 mm or more, 0.4 mm or more, or 0.5 mm or more. Further, in one or a plurality of embodiments, the glass plate has a thickness of 3 mm or less or 1 mm or less, for example.

[Method for Manufacturing Laminated Composite Material]

The laminated composite material according to the present disclosure can be manufactured by applying the polyamide solution according to the present disclosure onto a glass plate, and drying, and if necessary curing, the applied solution.

In one or a plurality of embodiments of the present disclosure, a method for manufacturing the laminated composite material of the present disclosure includes the steps of:

a) applying a solution of an aromatic polyamide onto a base (glass plate); and b) heating the casted polyamide solution to form a polyamide film after the applying step (a).

In one or a plurality of embodiments of the present disclosure, from the viewpoint of suppression of curvature deformation (warpage) and/or enhancement of dimension stability, the heating is carried out under the temperature ranging from approximately +40° C. of the boiling point of the solvent to approximately +100° C. of the boiling point of the solvent, preferably from approximately +60° C. of the boiling point of the solvent to approximately +80° C. of the boiling point of the solvent, more preferably approximately +70° C. of the boiling point of the solvent. In one or a plurality of embodiments of the present disclosure, from the viewpoint of suppression of curvature deformation (warpage) and/or enhancement of dimension stability, the temperature of the heating in step (b) is between approximately 200° C. and approximately 250° C. In one or a plurality of embodiments of the present disclosure, from the viewpoint of suppression of curvature deformation (warpage) and/or enhancement of dimension stability, the time of the heating is more than approximately 1 minute and less than approximately 30 minutes.

[Amount of Curvature]

In the present disclosure, "amount of curvature" indicates the amount of warpage deformation of a laminated composite material produced by laminating a polyamide resin formed by casting on a glass plate a polyamide solution according to the present disclosure. In one or a plurality of embodiments, the amount of curvature refers to a difference between the maximal value and a minimal value of height of the laminated composite material measured with a laser displacement sensor. In one or a plurality of embodiments, the amount of curvature is measured by the method as described in Examples. When the value of the amount of curvature is positive, it means that the laminated composite material is the higher at the periphery than at the center; when the value of the amount of curvature is negative, it means that the laminated composite material is the lower at the periphery than at the center.

In one or a plurality of embodiments, regarding the polyamide solution according to the present disclosure, the amount of curvature of the laminated composite material measured by the method as described in Examples is preferably −100 μm or more and 100 μm or less, more preferably −90 μm or more and 90 μm or less, further preferably −85 μm or more and 85 μm or less, from the viewpoint of improving the yield in manufacturing a laminated composite material or a display element, an optical element, an illumination element or a sensor element.

The method for manufacturing the laminated composite material may include, following the step (b), a curing step (c) in which the polyamide film is cured. The curing temperature depends upon the capability of a heating device but is 220 to 420° C., 280 to 400° C., 330° C. to 370° C., 340° C. or more, or 340 to 370° C., in one or a plurality of embodiments. Further, in one or a plurality of embodiments, the curing time is 5 to 300 minutes or 30 to 240 minutes.

[Method for Manufacturing Display Element, Optical Element or Illumination Element]

The present disclosure, in one aspect, relates to a method for manufacturing a display element, an optical element, or an illumination element, which includes the step of forming the display element, the optical element, or the illumination element on a surface of the organic resin layer of the laminated composite material according to the present disclosure, i.e., a surface opposite to the surface facing the glass plate. In one or a plurality of embodiments, the manufacturing method further includes the step of de-bonding the thus formed display element, the optical element, or the illumination element formed from the glass plate.

[Display Element, Optical Element, or Illumination Element]

The term "a display element, an optical element, or an illumination element" as used in the present disclosure refers to an element that constitutes a display (display device), an optical device, or an illumination device, and examples of such elements include an organic EL element, a liquid crystal element, and organic EL illumination. Further, the term also covers a component of such elements, such as a thin film transistor (TFT) element, a color filter element or the like. In one or a plurality of embodiments, the display element, the optical element or the illumination element according to the present disclosure may include a product manufactured by using the polyamide solution according to the present disclosure, and a product using a polyamide film according to this disclosure as a substrate for the display element, the optical element or the illumination element.

<Non-Limiting Embodiment of Organic EL Element>

Hereinafter, one embodiment of an organic EL element as one embodiment of the display element according to the present disclosure will be described with reference to the drawing.

Figure 4:
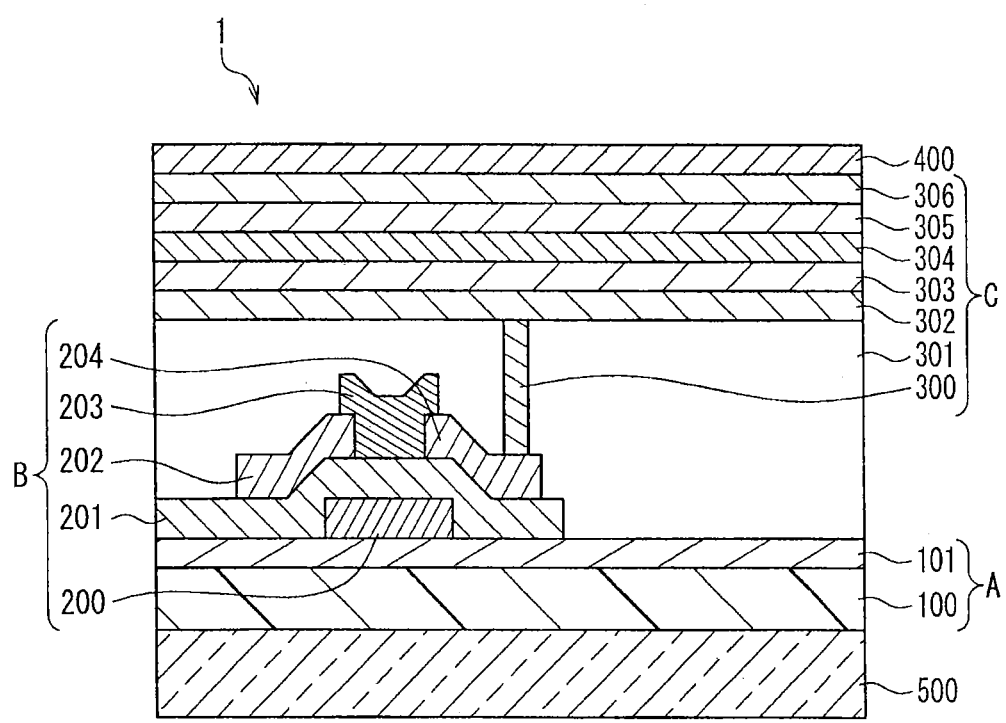
FIG. 4 is a schematic cross-sectional view showing a configuration of an organic EL element 1 according to one embodiment.

FIG. 4 is a schematic cross-sectional view showing an organic EL element 1 according to one embodiment. The organic EL element 1 includes a thin film transistor B formed on a substrate A and an organic EL layer C. Note that the organic EL element 1 is entirely covered with a sealing member 400. The organic EL element 1 may be separated from a base 500 or may include the base 500. Hereinafter, each component will be described in detail.

1. Substrate A

The substrate A includes a transparent resin substrate 100 and a gas barrier layer 101 formed on top of the transparent resin substrate 100. Here, the transparent resin substrate 100 is the polyamide film according to the present disclosure.

The transparent resin substrate 100 may have been annealed by heat. Annealing is effective in, for example, removing distortions and in improving the size stability against environmental changes.

The gas barrier layer 101 is a thin film made of $SiOx$, $SiNx$ or the like, and is formed by a vacuum deposition method such as sputtering, CVD, vacuum deposition or the like. Generally, the gas barrier layer 101 has a thickness of, but is not limited to, about 10 nm to 100 nm. Here, the gas barrier layer 101 may be formed on the side of the transparent resin substrate 100 facing the gas barrier layer 101 in FIG. 1 or may be formed on the both sides.

2. Thin Film Transistor

The thin film transistor B includes a gate electrode 200, a gate insulating film 201, a source electrode 202, an active layer 203, and a drain electrode 204. The thin film transistor B is formed on the gas barrier layer 101.

The gate electrode 200, the source electrode 202, and the drain electrode 204 are transparent thin films made of indium tin oxide (ITO), indium zinc oxide (IZO), zinc oxide (ZnO), or the like. For example, sputtering, vapor deposition, ion plating or the like may be use to form these transparent thin films. Generally, these electrodes have a film thickness of, but is not limited to, about 50 nm to 200 nm.

The gate insulating film 201 is a transparent insulating thin film made of $SiO_2$, $Al_2O_3$ or the like, and is formed by sputtering, CVD, vacuum deposition, ion plating or the like. Generally, the gate insulating film 201 has a film thickness of, but is not limited to, about 10 nm to 1 μm.

The active layer 203 is a layer of, for example, single crystal silicon, low temperature polysilicon, amorphous silicon, or oxide semiconductor, and a material best suited to the active layer 203 is used as appropriate. The active layer is formed by sputtering or the like.

3. Organic EL Layer

The organic EL layer C includes a conductive connector 300, an insulative flattened layer 301, a lower electrode 302 as the anode of the organic EL element 1, a hole transport layer 303, a light-emitting layer 304, an electron transport layer 305, and an upper electrode 306 as the cathode of the organic EL element 1. The organic EL layer C is formed at least on the gas barrier layer 101 or on the thin film transistor B, and the lower electrode 302 and the drain electrode 204 of the thin film transistor B are connected to each other electrically through the connector 300. Instead, the lower electrode 302 and the source electrode 202 of the thin film transistor B may be connected to each other through the connector 300.

The lower electrode 302 is the anode of the organic EL element 1, and is a transparent thin film made of indium tin oxide (ITO), indium zinc oxide (IZO), zinc oxide (ZnO) or the like. ITO is preferred because, for example, high transparency, and high conductivity can be achieved.

For the hole transport layer 303, the light-emitting layer 304, and the electron transport layer 305, conventionally-known materials for organic EL elements can be used as is.

The upper electrode 306 is a film composed of a layer of lithium fluoride (LiF) having a film thickness of 5 nm to 20 nm and a layer of aluminum (Al) having a film thickness of 50 nm to 200 nm. For example, vapor deposition may be used to form the film.

When producing a bottom emission type organic EL element, the upper electrode 306 of the organic EL element 1 may be configured to have optical reflectivity. Thereby, the upper electrode 306 can reflect in the display side direction light generated by the organic EL element 1 and traveled toward the upper side as the opposite direction to the display side. Since the reflected light is also utilized for a display purpose, the emission efficiency of the organic EL element can be improved.

[Method of Manufacturing Display Element, Optical Element, or Illumination Element]

Another aspect of the present disclosure relates to a method of manufacturing a display element, an optical element, or an illumination element. In one or a plurality of embodiments, the manufacturing method according to the present disclosure is a method of manufacturing the display element, the optical element, or the illumination element according to the present disclosure. Further, in one or a plurality of embodiments, the manufacturing method according to the present disclosure is a method of manufacturing a display element, an optical element, or an illumination element, which includes the steps of applying the polyamide resin solution according to the present disclosure onto a base; forming a polyamide film after the application step; and forming the display element, the optical element, or the illumination element on a surface of the polyamide film not in contact with the base. The manufacturing method according to the present disclosure may further include the step of de-bonding, from the base, the display element, the optical element, or the illumination element formed on the base.

<Non-Limiting Embodiment of Method of Producing Organic EL Element>

As one embodiment of the method of manufacturing a display element according to the present disclosure, hereinafter, one embodiment of a method of manufacturing an organic EL element will be described with reference to the drawing.

A method of producing the organic EL element 1 shown in FIG. 4 includes a fixing step, a gas barrier layer production step, a thin film transistor production step, an organic EL layer production step, a sealing step and a de-bonding step. Hereinafter, each step will be described in detail.

1. Fixing Step

In the fixing step, the transparent resin substrate 100 is fixed onto the base 500. A way to fix the transparent resin substrate to the base is not particularly limited. For example, an adhesive may be applied between the base 500 and the transparent substrate, or a part of the transparent resin substrate 100 may be fused and attached to the base 500 to fix the transparent resin substrate 100 to the base 500.

Further, as the material of the base, glass, metal, silicon, resin or the like is used, for example. These materials may be used alone or in combination of two or more as appropriate. Furthermore, the transparent resin substrate 100 may be attached to the base 500 by applying a releasing agent or the like onto the base 500 and placing the transparent resin substrate 100 on the applied releasing agent. In one or a plurality of embodiments, the polyamide film 100 is formed by applying the polyamide resin composition according to the present disclosure onto the base 500, and drying the applied polyamide resin composition.

2. Gas Barrier Layer Production Step

In the gas barrier layer production step, the gas barrier layer 101 is produced on the transparent resin substrate 100. A way to produce the gas barrier layer 101 is not particularly limited, and a known method can be used.

3. Thin Film Transistor Production Step

In the thin film transistor production step, the thin film transistor B is produced on the gas barrier layer. A way to produce the thin film transistor B is not particularly limited, and a known method can be used.

4. Organic EL Layer Production Step

The organic EL layer production step includes a first step and a second step. In the first step, the flattened layer 301 is formed. The flattened layer 301 can be formed by, for example, spin-coating, slit-coating, or ink-jetting a photo-sensitive transparent resin. At that time, an opening needs to be formed in the flattened layer 301 so that the connector 300 can be formed in the second step. Generally, the flattened layer has a film thickness of, but is not limited to, about 100 nm to 2 μm.

In the second step, first, the connector 300 and the lower electrode 302 are formed at the same time. Sputtering, vapor deposition, ion plating or the like may be used to form the connector 300 and the lower electrode 302. Generally, each of these electrodes has a film thickness of, but is not limited to, about 50 nm to 200 nm. Subsequently, the hole transport layer 303, the light-emitting layer 304, the electron transport layer 305, and the upper electrode 306 as the cathode of the organic EL element 1 are formed. To form these components, a method such as vapor deposition, application, or the like can be used as appropriate in accordance with the materials to be used and the laminate structure. Further, irrespective of the explanations given in this example, other layers may be chosen from known organic layers such as a hole injection layer, an electron transport layer, a hole blocking layer and an electron blocking layer as needed and be used to configuring the organic layers of the organic EL element 1.

5. Sealing Step

In the sealing step, the organic EL layer C is sealed with the sealing member 400 from top of the upper electrode 306. For example, a glass material, a resin material, a ceramics material, a metal material, a metal compound or a composite thereof can be used to form the sealing member 400, and a material best suited to the sealing member 307 can be chosen as appropriate.

6. De-Bonding Step

In the de-bonding step, the produced organic EL element 1 is de-bonded from the base 500. To implement the de-bonding step, for example, the organic EL element 1 may be physically stripped from the base 500. At that time, the base 500 may be provided with a de-bonding layer, or a wire may be inserted between the base 500 and the display element to remove the organic EL element. Further, examples of other methods of de-bonding the organic EL element 1 from the base 500 include the following: forming a de-bonding layer on the base 500 except at ends, and cutting, after the production of the element, the inner part from the ends to remove the element from the base; providing a layer of silicon or the like between the base 500 and the element, and irradiating the silicon layer with a laser to strip the element; applying heat to the base 500 to separate the base 500 and the transparent substrate from each other; and removing the base 500 using a solvent. These methods may be used alone or any of these methods may be used in combination of two or more. Especially in one or a plurality of embodiments, the strength of adhesion between the polyamide film and the base can be controlled by a silane coupling agent, so that the organic EL element 1 can be physically stripped without using the complicated method such as described above.

The organic EL element obtained by the method for manufacturing a display element, an optical element or an illumination element according to the present embodiment is excellent in transparency, heat resistance, low coefficient of thermal expansion, low optical anisotropy and the like in one or a plurality of embodiments.

[Display Device, Optical Device, and Illumination Device]

An aspect of the present disclosure relates to a display device, an optical device, or an illumination device using the display element, the optical element, or the illumination element according to the present disclosure, or a method of manufacturing the display device, the optical device, or the illumination device. Examples of the display device include, but are not limited to, an imaging element; examples of the optical device include, but are not limited to, a photoelectric complex circuit; and examples of the illumination device include, but are not limited to, a TFT-LCD and OEL illumination.

[Method for Manufacturing Sensor Element]

In another aspect, the present disclosure relates to a method for manufacturing a sensor element, including steps (A) and (B) below:

(A) applying a polyamide solution according to the present disclosure onto a base so as to form a polyamide film on the base;
(B) forming a sensor element on the surface of the polyamide film.

For the base, the above-mentioned base can be used.

In the step (A) of the manufacturing method in this aspect, a laminated composite material can be formed. In one or a plurality of embodiments, the step (A) of the manufacturing method in this aspect includes steps (i) and (ii) below:

(i) applying the above-mentioned polyamide solution onto a base (see FIG. 1, step A);
(ii) heating the applied polyamide solution after the step (i) so as to form a polyamide film (see FIG. 1, step B).

The application in the step (i) and the heating temperature in the step (ii) may be set as mentioned above. The manufacturing method in this aspect may include, following the step (ii), a curing step (iii) to cure the polyamide film. The temperature and the time period for the curing can be set as mentioned above.

The formation of the sensor element in the step (B) of the manufacturing method in this aspect is not limited in particular, but it can be carried out appropriately for the sensor element for manufacturing an element that has been or will be manufactured.

In one or a plurality of embodiments, the manufacturing method in this aspect includes, following the step (B), a step (C) for de-bonding a formed sensor element from a glass plate. In the de-bonding step (C), the produced sensor element is de-bonded from a base. The de-bonding step can be carried out as mentioned above.

[Sensor Element]

In the present disclosure, "sensor element" refers to a sensor element that may be used in an input device. In the present disclosure, a "sensor element" comprises a polyamide film formed of the polyamide solution according to the present disclosure in non-limiting one or a plurality of embodiments. Further, in another one or a plurality of embodiments, the "sensor element" in the present disclosure is a sensor element formed on a polyamide film formed on a base, and in any further one or a plurality of embodiments, it is a sensor element to be de-bonded from the base as required. In one or a plurality of embodiments, examples of the sensor element include a sensor element capable of receiving an electromagnetic wave, a sensor element capable of detecting a magnetic field, a sensor element capable of detecting the change in capacitance, or a sensor element capable of detecting the change in pressure. In one or a plurality of embodiments, examples of the sensor element include an imaging element, a radiation sensor element, a photo-sensor element, a magnetic sensor element, a capacitance sensor element, a touch sensor element, or a pressure sensor element and the like. In one or a plurality of embodiments, examples of the radiation sensor element include an X-ray sensor element. In one or a plurality of embodiments, the sensor elements in the present disclosure include what is manufactured by using the polyamide solution according to the present disclosure, and/or what is manufactured by using the laminated composite material according to the present disclosure, and/or what is manufactured by the method for manufacturing an element according to the present disclosure. Further, in one or a plurality of embodiments, formation of a sensor element according to the present disclosure includes formation of a photoelectric conversion element and a driver element therefor.

[Input Device]

In one or a plurality of embodiments, in the present disclosure, examples of an input device in which the "sensor element" is used include optical, imaging, magnetic, capacitance, or pressure input device. In non-limiting one or a plurality of embodiments, examples of the input device include a radiograph device, a visible-light imaging device, a magnetic sensor device, a touch panel, a fingerprint recognition panel, an illuminant using a piezoelectric element, and the like. In one or a plurality of embodiments, examples of the radiograph device include an X-ray imaging device. Furthermore, in non-limiting one or a plurality of embodiments, the input device according to the present disclosure may have functions of an output device, such as a display function. Therefore, in the aspect, the present disclosure relates to an input device using a sensor element manufactured by the manufacturing method in this aspect, and also relates to a method for manufacturing the same.

<Non-Limiting Embodiment for Sensor Element>

Hereinafter, an embodiment of sensor element that can be manufactured by the manufacturing method in this aspect are explained with reference to FIG. 5.

Figure 5:
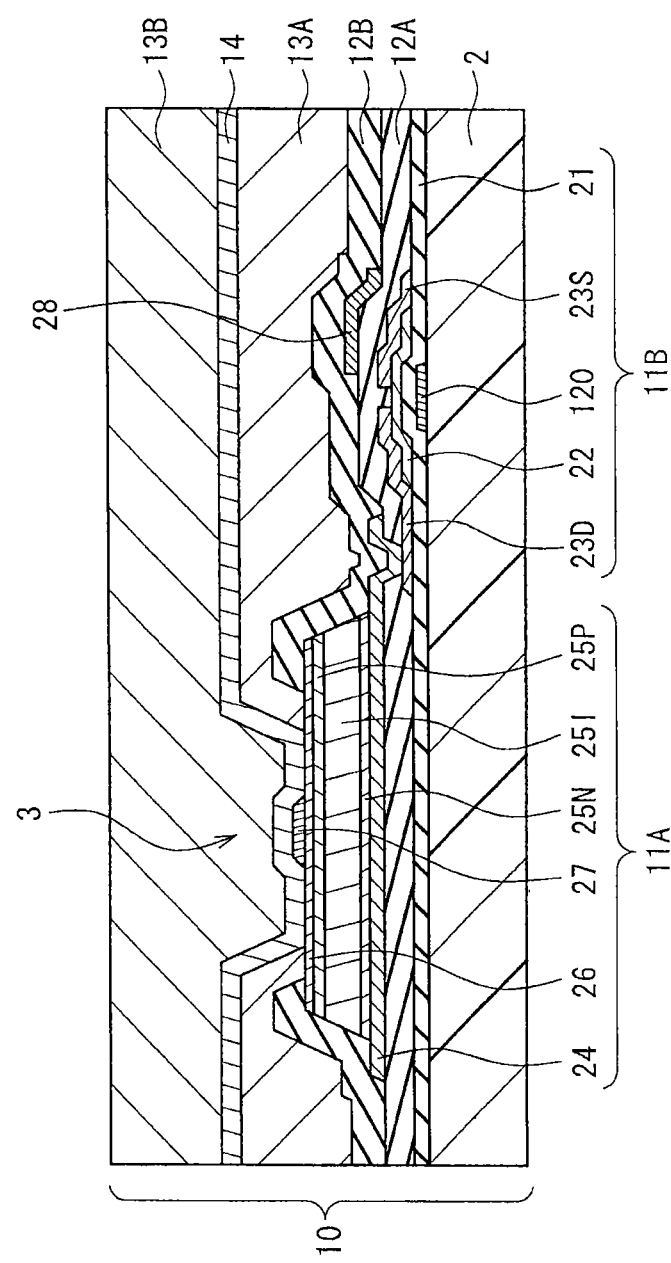
FIG. 5 is a schematic cross-sectional view showing a sensor element 10 according to one embodiment.

FIG. 5 is a schematic cross-sectional view showing a sensor element 10 according to an embodiment. The sensor element 10 has a plurality of pixels. This sensor element 10 is produced by forming, on a surface of a substrate 2, a pixel circuit including a plurality of photodiodes 11A (photoelectric conversion elements) and a thin film transistor (TFT) 11B as the driver element for the photodiodes 11A. This substrate 2 is the polyamide film to be formed on a base (not shown) by the step (A) of the manufacturing method in this aspect. And in the step (B) of the manufacturing method in this aspect, the photodiodes 11A (photoelectric conversion elements) and the thin film transistor 11B as the driver element for the photodiodes 11A are formed.

A gate insulating film 21 is provided on the substrate 2, and it is composed of a single layer film of any one of a silicon oxide ($SiO_2$) film, a silicon oxynitride (SiON) film and a silicon nitride (SiN) film for example, or two or more of them. A first interlayer insulating film 12A is provided on the gate insulating film 21, and it is composed of an insulating film such as a silicon oxide film and a silicon nitride film. This first interlayer insulating film 12A functions also as a protective film (passivation film) to cover the top of the thin film transistor 11B described below.

(Photodiode 11A)

The photodiode 11A is disposed on a selective region of the substrate 2 via the gate insulating film 21 and the first interlayer insulating film 12A. Specifically, the photodiode 11A is prepared by laminating, on the first interlayer insulating film 12A, a lower electrode 24, a n-type semiconductor layer 25N, an i-type semiconductor layer 25I, a p-type semiconductor layer 25P and an upper electrode 26 in this order. The upper electrode 26 is an electrode for supplying a reference potential (bias potential) during a photoelectric conversion for example to the above-mentioned photoelectric conversion layer, and thus it is connected to a wiring layer 27 as a power supply wiring for supplying the reference potential. This upper electrode 26 is composed of a transparent conductive film of ITO (indium tin oxide) or the like, for example.

(Thin Film Transistor 11B)

The thin film transistor 11B is composed of a field effect transistor (FET), for example. This thin film transistor 11B is prepared by forming on the substrate 2 a gate electrode 20 composed of titanium (Ti), Al, Mo, tungsten (W), chromium (Cr) and the like, and by forming the above-mentioned gate insulating film 21 on this gate electrode 20. Further, a semiconductor layer 22 is formed on the gate insulating film 21, and the semiconductor layer 22 has a channel region. On this semiconductor layer 22, a source electrode 23S and a drain electrode 23D are formed. Specifically, here, the drain electrode 23D is connected to the lower electrode 24 in each photodiode 11A while the source electrode 23S is connected to a relay electrode 28.

Furthermore in the sensor element 1, on such photodiode 11A and the thin film transistor 11B, a second interlayer insulating film 12B, a first flattened film 13A, a protective film 14 and a second flattened film 13B are provided in this order. Further in this first flattened film 13A, an opening 3 is formed corresponding to the region for forming the photodiode 11A.

On the sensor element 1, for example, a wavelength conversion member is formed to produce a radiograph device.

Viewed from one or more aspects, the present invention may relate to the following:

<1> A polyamide solution comprising an aromatic polyamide and a solvent, wherein the aromatic polyamide comprises at least two types of constitutional units, and a change rate between a coefficient of thermal expansion (CTE) of a cast film produced by casting the polyamide solution on a glass plate and CTE of the cast film after being subjected to a heat treatment at temperature of 200° C. to 450° C. (=CTE after heat treatment/CTE before heat treatment) is 1.3 or less.

<2> The polyamide solution according to <1>, wherein the cast film produced by casting the polyamide solution on the glass plate has a total light transmittance of 80% or more.

<3> The polyamide solution according to <1> or <2>, wherein the cast film produced by casting the aromatic polyamide solution on the glass plate has a glass transition temperature (Tg) of 365° C. or more.

<4> The polyamide solution according to <1> to <3>, wherein the CTE of the cast film produced by casting the polyamide solution on the glass plate is 20.0 ppm/° C. or more.

<5> The polyamide solution according to <1> to <4>, wherein a constitutional unit as a rigid component makes up more than 35.0 mol % of the total constitutional units of the aromatic polyamide.

<6> The polyamide solution according to any one of <1> to <5>, wherein a monomer as the rigid component makes up more than 35.0 mol % of the total monomers used in synthesis of the aromatic polyamide.

<7> The polyamide solution according to <5> or <6>, wherein an aromatic monomer as the rigid component is selected from the group consisting of 9,9-bis(4-aminophenyl)fluorene (FDA), telephthaloyl dichloride (TPC), and a combination thereof.

<8> The polyamide solution according to any one of <1> to <7>, wherein at least one of the constitutional units constituting the aromatic polyamide has at least one free carboxyl group.

<9> The polyamide solution according to any one of <1> to <8> for use in a method for manufacturing a display element, an optical element, an illumination element or a sensor element, comprising the steps of:

a) applying a polyamide solution onto a base;

b) forming a polyamide film on the base after the applying step (a); and c) forming the display element, the optical element, the illumination element or the sensor element on the surface of the polyamide film.

<10> A laminated composite material, comprising a glass plate and a polyamide resin layer;

wherein the polyamide resin layer is laminated on one surface of the glass plate, and wherein the polyamide resin is a polyamide resin produced by casting the polyamide solution according to any one of <1> to <9> on a glass plate.

<11> A method for manufacturing a display element, an optical element, an illumination element or a sensor element, comprising the steps of:

a) applying the polyamide solution according to any one of <1> to <9> onto a base;

b) forming a polyamide film on the base after the applying step (a); and c) forming the display element, the optical element, the illumination element, or the sensor element on the surface of polyamide film.

<12> A display element, an optical element, an illumination element or a sensor element manufactured by the method according to <11>.

EXAMPLES

[Preparation of Polyamide Solution]

Polyamide solutions (Solutions 1 to 3) were prepared by using the ingredients listed in Table 1 and indicated below. Number-average molecular weight (Mn) and weight-average molecular weight (Mw) of the prepared polyamide, and also glass transition temperature (Tg), elastic modulus, coefficient of thermal expansion (CTE) of the films formed by using the thus prepared polyamide solutions were measured in the following manner.

[Aromatic Diamine]
PFMB: 4,4'-diamino-2,2'-bistrifluoromethylbenzidine;

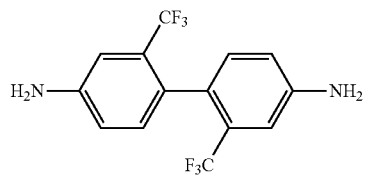 [SMILES: Nc1ccc(-c2ccc(N)cc2C(F)(F)F)c(C(F)(F)F)c1]

DAB: 3,5-diaminobenzoic acid;

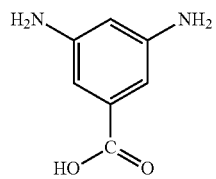

FDA: 9,9-bis(4-aminophenyl)fluorene;

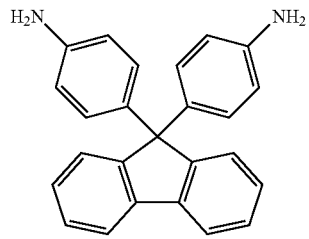 [SMILES: Nc1ccc(C2(c3ccc(N)cc3)c3ccccc3-c3ccccc32)cc1]

FFDA: 9,9-bis(3-fluoro-4-aminophenyl)fluorene;

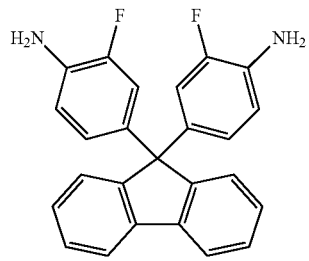 [SMILES: Nc1ccc(C2(c3ccc(N)c(F)c3)c3ccccc3-c3ccccc32)cc1F]

[Solvent]
DMAc: N,N-dimethylacetamide
[Aromatic Diacid Dichloride]
TPC: terephthaloyl dichloride;

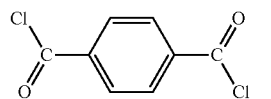 [SMILES: O=C(Cl)c1ccc(C(=O)Cl)cc1]

IPC: isophthaloyl dichloride;

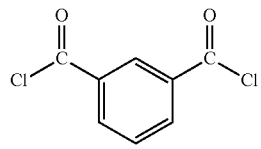 [SMILES: O=C(Cl)c1cccc(C(=O)Cl)c1]

[Trapping Reagent]
PrO: Propylene oxide
[Number Average Molecular Weight (Mn) and Weight-Average Molecular Weight (Mw)]
The number-average molecular weight (Mn) and the weight-average molecular weight (Mw) of the synthesized polyamide were measured by using the device and the mobile phase below.

Device: Gel Permeation Chromatography (HLC-8320 GPC, manufactured by Tosoh Corporation)
Mobile phase: DMAc, lithium bromide 10 mM, phosphoric acid 5 mM
[Glass Transition Temperature (Tg), Elastic Modulus (E')]
For E' and Tg of each polyamide film, the dynamic viscoelasticity from 25° C. to 400° C. was measured at warming rate of 5° C./min., tensile force of 10 mN, and under an atmospheric condition with a dynamic mechanical analyzer (Rheovibron DDV-01FP, manufactured by A&D Company Limited) so as to obtain E' at 30° C., and the maximal value of tan D at measurement was set to Tg.
[Coefficient of Thermal Expansion (CTE)]
As the coefficient of thermal expansion (CTE) of each of the polyamide films, an average coefficient of thermal expansion measured in the following manner was adopted.

First, the temperature of samples was increased from 30° C. to 300° C. at a rate of 10° C./min under a nitrogen atmosphere, followed by keeping the temperature at 300° C. for 30 minutes, and then cooled to 25° C. at a rate of 10° C./min, and the average coefficient of thermal expansion of the samples undergone the method was measured, using TMA4000SA manufactured by Bruker AXS. The width of each sample was 5 mm, and the load was 2 g. The measurement was carried out in the tensile mode. The average coefficient of thermal expansion was determined using the following formula.

$$\text{Average coefficient of thermal expansion (ppm/K)} = ((L_{300} - L_{30})/L_{30})/(300-30) \times 10^6$$

$L_{300}$: Sample length at 300° C.
$L_{30}$: Sample length at 30° C.
[CTE Change Rate]
The CTE change rate of a polyamide film was calculated in the following manner. The polyamide film was subjected to a heat treatment (325° C./8 hours), and the CTE of the polyamide film after the heat treatment (CTE after heat treatment) was measured in the manner as mentioned above. In the meantime, the CTE of a polyamide film not being subjected to such a heat treatment was measured (CTE before heat treatment). The ratio of these (=CTE after heat treatment/CTE before heat treatment) was determined as the CTE change rate.

Hereinafter, a general procedure for the preparation of Solution 1 containing 5% by weight of a copolymer of TPC, FDA, PFMB and DAB (TPC/FDA/PFMB/DAB=100%/15%/80%/5% mol ratio) in DMAc.

To a 250 ml three-necked round bottom flask equipped with a mechanical stirrer, a nitrogen inlet and outlet, were added FDA (0.523 g, 0.0015 mol), PFMB (2.562 g, 0.008 mol), DAB (0.0761 g, 0.0005 mol) and DMAc (45 ml). After the FDA, the PFMB and the DAB were dissolved completely, PrO (1.4 g, 0.024 mol) was added to the solution. The solution was cooled to 0° C. After the addition, TPC (2.121 g, 0.01 mol) was added to the solution while stirring. The flask inner wall was washed with DMAc (1.5 ml). After two hours, benzoyl chloride (0.032 g, 0.23 mmol) was added to the solution and stirred for another two hours, thereby the Solution 1 was obtained.

Similarly to Solution 1, Solution 2-4 were prepared as 5 wt % polyamide solutions.

[Formation of Polyamide Film]

Each of the prepared polyamide Solutions 1 to 4 was cast on a glass substrate in order to examine the properties.

Each polyamide solution was applied by spin coating on a flat glass substrate (10 cm×10 cm, trade name: EAGLE XG, manufactured by Corning Inc., USA). After drying the casted solution at 60° C. for 30 minutes or more, the temperature was increased from 60° C. to 330° C. or 350° C., and the temperature was kept at 330° C. or 350° C. for 30 minutes under vacuum or in an inert atmosphere to cure the film. The polyamide films obtained each had a thickness of about 10 μm.

The properties of the polyamide films (Tg, elastic modulus, CTE and CTE change rate) were measured in the above-described manners. The results are shown in Table 1 below.

[Warpage Evaluation]

Each of the polyamide solutions was applied onto a flat glass substrate (370 mm×470 mm×0.7 mm (thickness), soda lime glass) by spin coating. After drying at 60° C. for 30 minutes or more, the temperature was increased from 60° C. to 330° C. or 350° C., and the temperature was kept at 330° C. or 350° C. for 30 or 60 minutes under vacuum or in an inert atmosphere to cure the film. The obtained polyamide film had a thickness of about 10 μm. Warpage of the laminated polyamide film and glass was measured with a laser displacement sensor (LT9010, from KEYENCE). The difference between the maximal value and the minimal value of height was set as the amount of curvature.

TABLE 1

| | Composition | | | | | Rigid component rate (mol %) TPC + FDA | Film Property | | | After heat treatment | | | Rth @ 550 nm (nm) |
|---|---|---|---|---|---|---|---|---|---|---|---|---|---|
| | Diacid dichloride | | Diamine | | | | Tg (° C.) | CTE (ppm/K) 30-300 | light transmittance | CTE (ppm/K) 30-300 | CTE change rate | Amount of Curvature (um) | |
| | TPC | IPC | FDA | PFMB | DAB | | | | | | | | |
| Solution 1 | 100 | 0 | 15 | 80 | 5 | 57.5 | 388 | 9.1 | >80% | 11.0 | 1.21 | 78 | 720 |
| Solution 2 | 100 | 0 | 45 | 50 | 5 | 72.5 | 411 | 21.8 | >80% | 26.8 | 1.23 | 83 | 454 |
| Solution 3 | 100 | 0 | 75 | 20 | 5 | 87.5 | 423 | 34.5 | >80% | 37.5 | 1.09 | 81 | 240 |
| Solution 4 | 10 | 90 | 0 | 95 | 5 | 5.0 | 340 | 43.0 | >80% | 63.7 | 1.48 | 105 | 64 |

As shown in Table 1, in the polyamide films produced from Solutions 1-3 each having CTE change rate of 1.3 or less, warpage was suppressed in comparison with the polyamide film produced from Solution 4 having CTE change rate of more than 1.3.

The embodiments have been described, hereinabove. It will be apparent to those skilled in the art that the above methods and apparatuses may incorporate changes and modifications without departing from the general scope of the present disclosure. It is intended to include all such modifications and alterations insofar as they come within the scope of the appended claims or the equivalents thereof. Although the description above contains much specificity, this should not be construed as limiting the scope of the disclosure, but as merely providing illustrations of some of the embodiments of the present disclosure. Various other embodiments and ramifications are possible within its scope.

Furthermore, notwithstanding that the numerical ranges and parameters setting forth the broad scope of the disclosure are approximations, the numerical values set forth in the specific examples are reported as precisely as possible. Any numerical value, however, inherently contain certain errors necessarily resulting from the standard deviation found in their respective testing measurements.

The invention claimed is:

1. A polyamide solution, comprising:
an aromatic polyamide; and
a solvent that dissolves the aromatic polyamide,
wherein the aromatic polyamide comprises a first constitutional unit and a second constitutional unit and comprises a rigid component in an amount of more than 35.0 mol % to less than 90 mol % with respect to the total constitutional units of the aromatic polyamide where the rigid component is selected from the group consisting of 9,9-bis(4-aminophenyl)fluorene, 9,9-bis(3-fluoro-4-aminophenyl)fluorene, terephthaloyl dichloride and 4,4'-biphenyldicarbonyl dichloride, when the polyamide solution is cast on a glass plate to form a cast film, a coefficient of thermal expansion of the cast film produced by casting the polyamide solution on the glass plate is 20.0 ppm/° C. or more and a change rate between the coefficient of thermal expansion of the cast film before and after a heat treatment at temperature of 200° C. to 450° C., CTE after the heat treatment/CTE before the heat treatment, is 1.3 or less, and the aromatic polyamide comprises the first constitutional unit having a formula (I) formed by reacting an aromatic diamine with an aromatic diacid dichloride and the second constitutional unit having a formula (II) formed by reacting an aromatic diamine with an aromatic diacid dichloride,

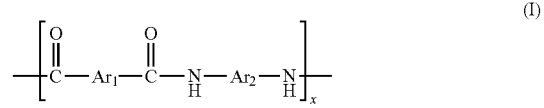

(I)

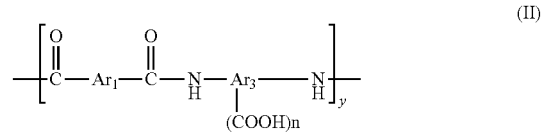

(II)

where x represents mol % of the first constitutional unit, y represents mol % of the second constitutional unit, x is from 90 to 99.99%, y is from 10 to 0.01 mol %, n=1 to 4, $Ar_1$ is selected from the group consisting of

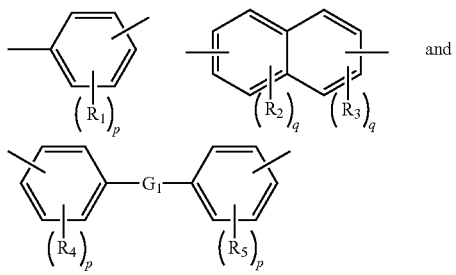

where p=4, q=3, $R_1$, $R_2$, $R_3$, $R_4$ and $R_5$ are selected from the group consisting of hydrogen, halogen, alkyl, substituted alkyl, nitro, cyano, thioalkyl, alkoxy, substituted alkoxy, aryl, substituted aryl, alkyl ester, substituted alkyl ester, and a combination thereof, $G_1$ is selected from the group consisting of a covalent bond, a $CH_2$ group, a $C(CH_3)_2$ group, a $C(CF_3)_2$ group, a $C(CX_3)_2$ group where X is a halogen, a CO group, an O atom, a S atom, a $SO_2$ group, a Si $(CH_3)_2$ group, a 9,9-fluorene group, a substituted 9,9-fluorene group, and an OZO group where Z is an aryl group or substituted aryl group, $Ar_2$ is selected from the group consisting of

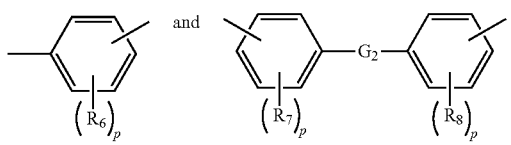

where p=4, $R_6$, $R_7$, and $R_8$ are selected from the group consisting of hydrogen, halogen, alkyl, substituted alkyl, nitro, cyano, thioalkyl, alkoxy, substituted alkoxy, aryl, substituted aryl, alkyl ester, substituted alkyl ester, and a combination thereof, $G_2$ is selected from the group consisting of a covalent bond, a $CH_2$ group, a $C(CH_3)_2$ group, a $C(CF_3)_2$ group, a $C(CX_3)_2$ group where X is a halogen, a CO group, an O atom, a S atom, a $SO_2$ group, a Si $(CH_3)_2$ group, a 9,9-fluorene group, a substituted 9,9-fluorene group, and an OZO group where Z is an aryl group or substituted aryl group, $Ar_3$ is selected from the group consisting of

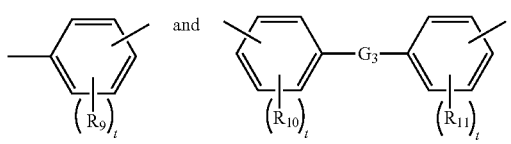

where t=0 to 3, $R_9$ $R_{10}$ and $R_{11}$ are selected from the group consisting of hydrogen, halogen, alkyl, substituted alkyl, nitro, cyano, thioalkyl, alkoxy, substituted alkoxy, aryl, substituted aryl, alkyl ester, substituted alkyl ester, and a combination thereof, $G_3$ is selected from the group consisting of a covalent bond, a $CH_2$ group, a $C(CH_3)_2$ group, a $C(CF_3)_2$ group, a $C(CX_3$ group where X is a halogen, a CO group, an O atom, a S atom, a $SO_2$ group, a Si $(CH_3)_2$ group, a 9,9-fluorene group, a substituted 9,9-fluorene group, and an OZO group where Z is an aryl group or substituted aryl group.

2. The polyamide solution according to claim 1, wherein the cast film produced by casting the polyamide solution on the glass plate has a total light transmittance of 80% or more.

3. The polyamide solution according to claim 1, wherein the cast film produced by casting the aromatic polyamide solution on the glass plate has a glass transition temperature Tg of 365° C. or more.

4. The polyamide solution according to claim 1, wherein the coefficient of thermal expansion of the cast film produced by casting the polyamide solution on the glass plate is 22 ppm/° C. or more.

5. The polyamide solution according to claim 1, wherein one of the first and second constitutional units comprises the rigid component.

6. The polyamide solution according to claim 1, wherein y is 0.1 mol % to 9.9 mol %.

7. A method for manufacturing a polyamide film for a display element, an optical element, an illumination element or a sensor element, comprising:
applying the polyamide solution of claim 1 onto a base; and
forming, on the base, a polyamide film from the polyamide solution applied on the base such that the polyimide film has a surface for forming a display element, an optical element, an illumination element or a sensor element.

8. A laminated composite material, comprising:
a glass plate; and
a polyamide resin layer formed on the glass plate,
wherein the polyamide resin layer is laminated on one surface of the glass plate, and the polyamide resin layer is produced by casting the polyamide solution of claim 1 on the one surface of the glass plate.

9. A method for manufacturing a display element, an optical element, an illumination element or a sensor element, comprising:
applying the polyamide solution of claim 1 onto a base;
forming, on the base, a polyamide film from the polyamide solution; and
forming the display element, the optical element, the illumination element, or the sensor element on the surface of the polyamide film.

10. A display element, an optical element, an illumination element or a sensor element manufactured by the method of claim 9.

11. The polyamide solution according to claim 1, wherein the amount of the rigid component is more than 40.0 mol % to less than 90 mol % with respect to the total constitutional units of the aromatic polyamide.

12. The polyamide solution according to claim 1, wherein the amount of the rigid component is more than 50.0 mol % to less than 90 mol % with respect to the total constitutional units of the aromatic polyamide.

13. The polyamide solution according to claim 1, wherein the amount of the rigid component is more than 55.0 mol % to less than 90 mol % with respect to the total constitutional units of the aromatic polyamide.

14. The polyamide solution according to claim 1, wherein the coefficient of thermal expansion of the cast film produced by casting the polyamide solution on the glass plate is 24 ppm/° C. or more.

15. The polyamide solution according to claim 1, wherein the amount of the rigid component is more than 35.0 mol % to 80 mol % or less with respect to the total constitutional units of the aromatic polyamide.

16. The polyamide solution according to claim 1, wherein the amount of the rigid component is 40.0 mol % or more to 80 mol % or less with respect to the total constitutional units of the aromatic polyamide.

17. The polyamide solution according to claim 1, wherein the amount of the rigid component is more than 35.0 mol % to 70 mol % or less with respect to the total constitutional units of the aromatic polyamide.

18. The polyamide solution according to claim 1, wherein the amount of the rigid component is 40.0 mol % or more to 70 mol % or less with respect to the total constitutional units of the aromatic polyamide.

19. The polyamide solution according to claim 1, wherein the amount of the rigid component is 50.0 mol % or more to 80 mol % or less with respect to the total constitutional units of the aromatic polyamide.

20. The polyamide solution according to claim 1, wherein the amount of the rigid component is 55.0 mol % or more to 70 mol % or less with respect to the total constitutional units of the aromatic polyamide.

* * * * *